United States Patent [19]

Bell et al.

[11] Patent Number: 5,127,047
[45] Date of Patent: Jun. 30, 1992

[54] FACSIMILE MACHINE HAVING USER NOTIFICATION CAPABILITY

[75] Inventors: John F. Bell, Howell; Carole R. Katz, Morris Plains; Mark E. Millman, Bayville; Mary Nesius, Califon; Ellen O'Brien, Neptune City; Michael L. Vandervoort, Shreveport; Gary N. Weber, Ocean, all of N.J.

[73] Assignee: AT&T Bell Laboratories, Murray Hill, N.J.

[21] Appl. No.: 482,366

[22] Filed: Feb. 20, 1990

[51] Int. Cl.$^5$ .................. H04M 11/00; H04N 1/32
[52] U.S. Cl. ............................ 379/100; 379/93
[58] Field of Search .................. 379/100, 94, 93, 40

[56] References Cited

U.S. PATENT DOCUMENTS 4,654,718  3/1987  Sueyoshi ................... 379/100
4,864,412  9/1989  Ueno ........................ 379/100

FOREIGN PATENT DOCUMENTS 57-46569  3/1982  Japan ....................... 379/100
0090460   5/1985  Japan ....................... 379/106
0232560   9/1988  Japan ....................... 379/100
0016163   1/1989  Japan ....................... 379/100
0091565   4/1989  Japan ....................... 379/100
0261964  10/1989  Japan ....................... 379/100
0264358  10/1989  Japan ....................... 379/100
2106354   3/1983  United Kingdom ............ 379/40

Primary Examiner—James L. Dwyer
Assistant Examiner—Stella L. Woo
Attorney, Agent, or Firm—John A. Caccuro

[57] ABSTRACT

A facsmile machine determines the status of a received or a transmitted facsimile message and, in response thereto, dials a specified telephone number and outputs a status message to notify a user of the status of the received or transmitted facsimile message. Another feature outputs a status message to indicate a predetermined condition at the facsimile machine. The status message may include an audio message to a data message. Another feature uses information detected in the control portion of the facsimile message to identify which of a plurality of predefined facsimile machine users is to be notified of the receipt of the facsimile message. In one embodiment, the detected information includes the identity of the location that transmitted the facsimile message.

27 Claims, 6 Drawing Sheets

FIG. 5 NOTIFY LIST TABLE 500

| | LIST 501 | NOTIFY TEL NO. 503 | VOICE MESSAGE 504 | REPETITION 505 | DATA MESSAGE | TSI/RTI - LIST ITEMS 502 |
|---|---|---|---|---|---|---|
| 511 | 1 | 957-2000 | YES, 1 | 3 | NO | MR. JONES — 517<br>ABC CO. — 518<br>9431111 — 516<br>ATT* — 519<br>9571234 |
| 512 | 2 | 691-8937 | YES, 1 | 3 | NO | 555<br>666<br>XYZ CO.<br>ATT SAN FRAN — 524 |
| 513 | 3 | 957-3284 (SECRETARY) | YES, 1 | 3 | NO | ALL OTHER TSI/RTI — 523 |
| | | | | | | ERROR CONDITIONS |
| 514 | 4 | 957-3285 (MAINTENANCE) | YES, 2 | 1 | YES, 1 | TRANSMISSION ERRORS EXCEEDED |
| 515 | 5 | 957-3284 (SECRETARY) | YES, 3 | 3 | NO | EQUIPMENT MALFUNCTION |

FIG. 6

| | NOTIFY TELEPHONE NUMBERS | VOICE MESSAGE 610 | NUMBER OF REPETITIONS 611 | WHAT HAPPENS |
|---|---|---|---|---|
| 601 | *60P73148 | NO | N/A | LIGHT MESSAGE LIGHT ON EXT. 73148 |
| 602 | #60P73145RP*60P73145 | NO | N/A | CANCEL PREVIOUS MESSAGE (#60) AND SUBMIT NEW MESSAGE (*60) |
| 603 | 73147PPPPPPPPPPPPPPPP | YES, 1 | 3 | LEAVE ANSWERING MACHINE VOICE MESSAGE 1, REPEATED THREE TIMES. |
| 604 | 5551234PPPPPPPP9573146 | NO | N/A | CALL POCKET PAGING SYSTEM PHONE NO. (5551234) AND LEAVE THIS PHONE NO. |
| 605 | *10 | YES, 2 | 1 | PAGE STATION 10 THROUGH ITS SPEAKER AND ANNOUNCE VOICE MESSAGE 2 ONCE. |
| 606 | 70 | YES, 1 | 1 | ACTIVATE LOUDSPEAKER PAGING SYSTEM AND ANNOUNCE VOICE MESSAGE 2 ONCE. |
| 607 | 71 | YES, 1 | 3 | CALL A GROUP OF STATIONS AND REPEAT THE VOICE MESSAGE 1, REPEATED THREE TIMES. |
| 608 | *71 | YES, 1 | 1 | PAGE A GROUP OF STATIONS THROUGH THEIR SPEAKERS AND ANNOUNCE VOICE MESSAGE 1 ONCE. |

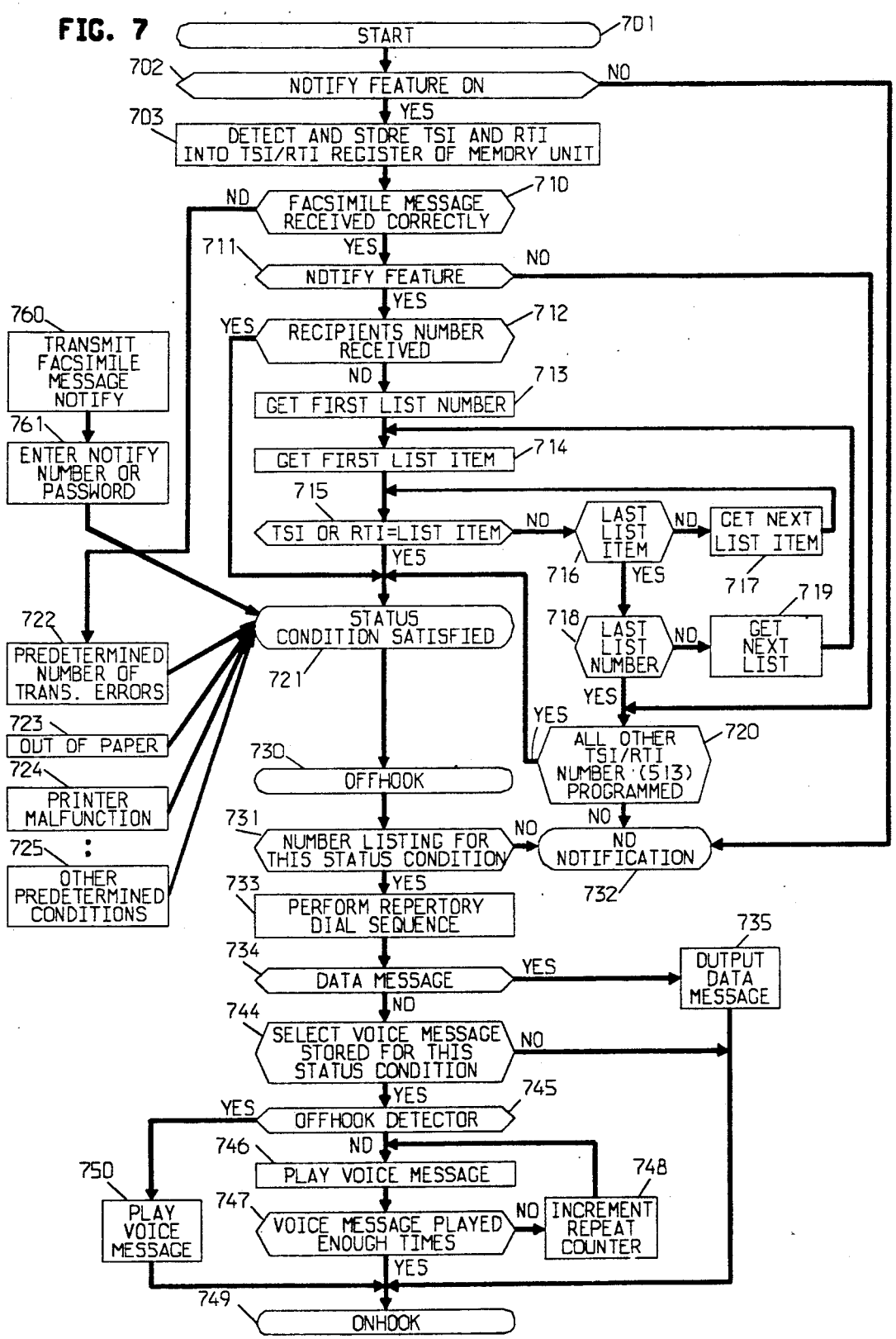

FACSIMILE MACHINE HAVING USER NOTIFICATION CAPABILITY

TECHNICAL FIELD

The present invention relates to image communication apparatus and, more particularly, to facsimile apparatus for communicating images over telephone lines.

BACKGROUND OF THE INVENTION

Today, facsimile machines are becoming commonplace in many business offices. The new facsimile machines offer a variety of features which enhance their usefulness. One common feature of prior art facsimile machines enables the automatic reception of messages even when the operator or user is not present. This has enabled the facsimile machines to be relegated to separate remote offices, along with printers and copying machines, to minimize the inconvenience caused by the noise they produce. As an unfortunate consequence, the recipient never knows when an expected facsimile message has been received and must make periodic trips to the facsimile machine location to determine if the message has arrived. One prior art arrangement includes an apparatus which connects to the facsimile machine and is wired to the recipients' location to provide a visual signal to indicate when a facsimile message has been received. Undesirably, besides the additional cost of the apparatus and the wiring, the apparatus does not distinguish between erroneous or correctly-received facsimiles messages.

SUMMARY OF THE INVENTION

In accordance with our present invention, a facsimile machine is arranged to determine the status of a received facsimile message and, in response thereto, dial a preprogrammed telephone number(s) and output a preprogrammed or prerecorded status message indicating the status of the received facsimile message. In one embodiment, when the status message indicates a correctly-received facsimile message, a call is dialed to a preselected user's telephone number and a prerecorded voice message and/or series of DTMF tones is outputted thereto. In another embodiment, the status of a transmitted facsimile message is used to initiate the dialing and outputting of a status message. In yet another embodiment, when a predetermined condition is detected at the facsimile machine, an appropriate preprogrammed number is selected and an appropriate status message is outputted indicating the condition at the facsimile machine.

According to another aspect of our invention, a facsimile machine is arranged to detect information in the control portion of the facsimile message received over a facility. The detected information is used to identify which of a plurality of predefined facsimile machine users should be notified of the receipt of the facsimile message. The facsimile machine notifies the identified user by dialing the user's telephone number and outputting a message thereto. In one embodiment, the detected information includes the identity of the location that transmitted the facsimile message. This transmitter location identifier is used to select the user to be notified from a list of users, each user having one or more transmitter location identifiers associated therewith.

A facsimile machine including the present invention provides remotely-located users with the notification features normally only possible by having a facsimile machine co-located with each user, but without disturbing noises produced by a co-located facsimile machine.

BRIEF DESCRIPTION OF THE DRAWING

In the drawing,

FIG. 5 is a notify list table used to store data required by the present invention;

FIG. 6 shows illustrative dialing commands which the facsimile machine can send to activate features of a connected communication system; and FIG. 7 is a flowchart showing the procedure for determining which telephone number should receive a notification call based on the stored TSI/RTI information.

GENERAL DESCRIPTION

Figure 1:
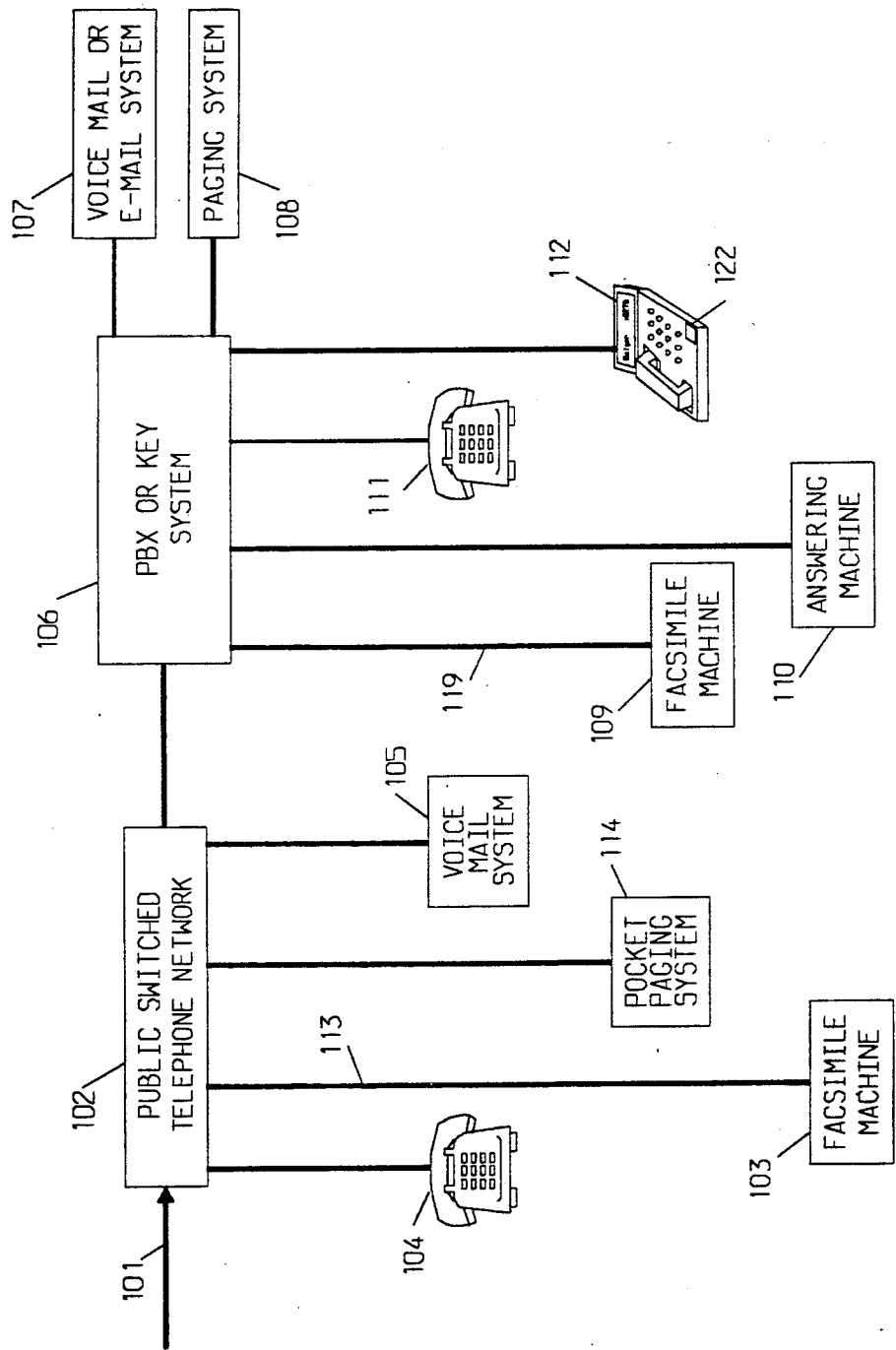
FIG. 1 shows an illustrative block diagram of two typical communication systems including a facsimile machine incorporating the present invention.

Shown in FIG. 1 is a block diagram of two illustrative communication system arrangements which utilize a facsimile machine incorporating the features of the present invention. One illustrative arrangement shows our inventive facsimile machine 103 directly connected to the public switched network 102. The second illustrative arrangement shows our inventive facsimile macnine 109 connected behind a key or private branch exchange (PBX) system 106.

A typical operating scenario for the first arrangement is described with joint reference to FIGs. 1-3, 5 and 7. In the following description, the first digit of an item's reference number designates the figure where the item is located (e.g., 203 is located in FIG. 2).

Assume a facsimile message is received by telephone network 102 over facility 101 addressed to facsimile machine 103. The facsimile transmission is routed via the telephone network 102 to the called facsimile machine 103. The TSI and/or RTI information (i.e., 303 of FIG. 3) is extracted from the Phase B portion of the standard CCITT facsimile transmission and stored in the memory unit 209 of facsimile machine 103. After the facsimile message is received, the received TSI and/or RTI information is checked against preprogrammed TSI/RTI entries 502 in a table 500 to determine the telephone number 501 of the facsimile machine user to be notified.

In one embodiment, the facsimile machine 103 seizes the telephone line 113 using the Network Control Unit (NCU) 204 and dials the telephone number of the user to be notified using the built-in Dual Tone Multi-Frequency (DTMF) generator or pulse dialer 223 of communication unit 213. The notified user's telephone 104 rings and is answered. The facsimile machine 103 then plays a prerecorded voice message a predetermined number of times from the voice synthesis chip 210 of the control unit 205. Note, a user's pocket pager system 114 could also be notified by facsimile machine 103. Additional signaling (e.g., See FIG. 6) using DTMF tones or other means could also be sent by facsimile machine 103 to the called telephone 104 or other called apparatus via telephone network 102. These signals could be used to instruct the far-end apparatus (e.g., voice mail system 105 which handles calls not answered by telephone 104) to do additional actions to notify the user that a facsimile has arrived at the facsimile machine 103. For example, a voice mail system 105 could be signalled by facsimile machine 103 to leave a standard message or to record the prerecorded voice message from facsimile machine 103 for subsequent output to the called party at telephone 104. The called party would then receive an indication that a voice mail message is waiting in the conventional manner.

For the case when facsimile machine 109 is connected behind PBX or key system 106, the following notify scenarios can be implemented. Assume the facsimile message has been received, as previously described, by facsimile machine 109. In this embodiment, facsimile machine 109 then seizes telephone line 119 using NCU 204 and dials the telephone number of the user to be notified by using the DTMF generator 223 of communication unit 213. The notified user's telephone 111 rings and is answered. The facsimile machine 109 then plays back the prerecorded message using voice synthesis chip 210.

As previously described, additional signaling via DTMF tones or other means could also be sent by facsimile machine 109. This signaling, illustrated in FIG. 6, could be used to instruct the far-end apparatus to do additional actions to notify the user that a facsimile has arrived at facsimile machine 109. For example, an answering machine 110 could be instructed to record a personal message for a user that a facsimile message has been received 603. A voice mail or electronic mail system 107 attached to the PBX or key system 106 could be instructed, via DTMF tones or additional signaling, to send a message to a specified telephone 111 or group of telephones (111, 112) once the facsimile message has arrived 605, 607. The facsimile machine 109 could also instruct a paging system 108 connected to the PBX or key system 106 to broadcast the message that a facsimile has been received 606. In addition, display telephone sets (e.g., 112) attached to the key system of PBX 106 could be instructed to display an indication that a facsimile has been received. This indication could be an audible buzzer, flashing or lit message waiting indicator 122, or a message displayed on the screen or display of telephone set 112. This message could optionally display the RTI or TSI information 303 associated with the received facsimile message.

DETAILED DESCRIPTION

Figure 2:
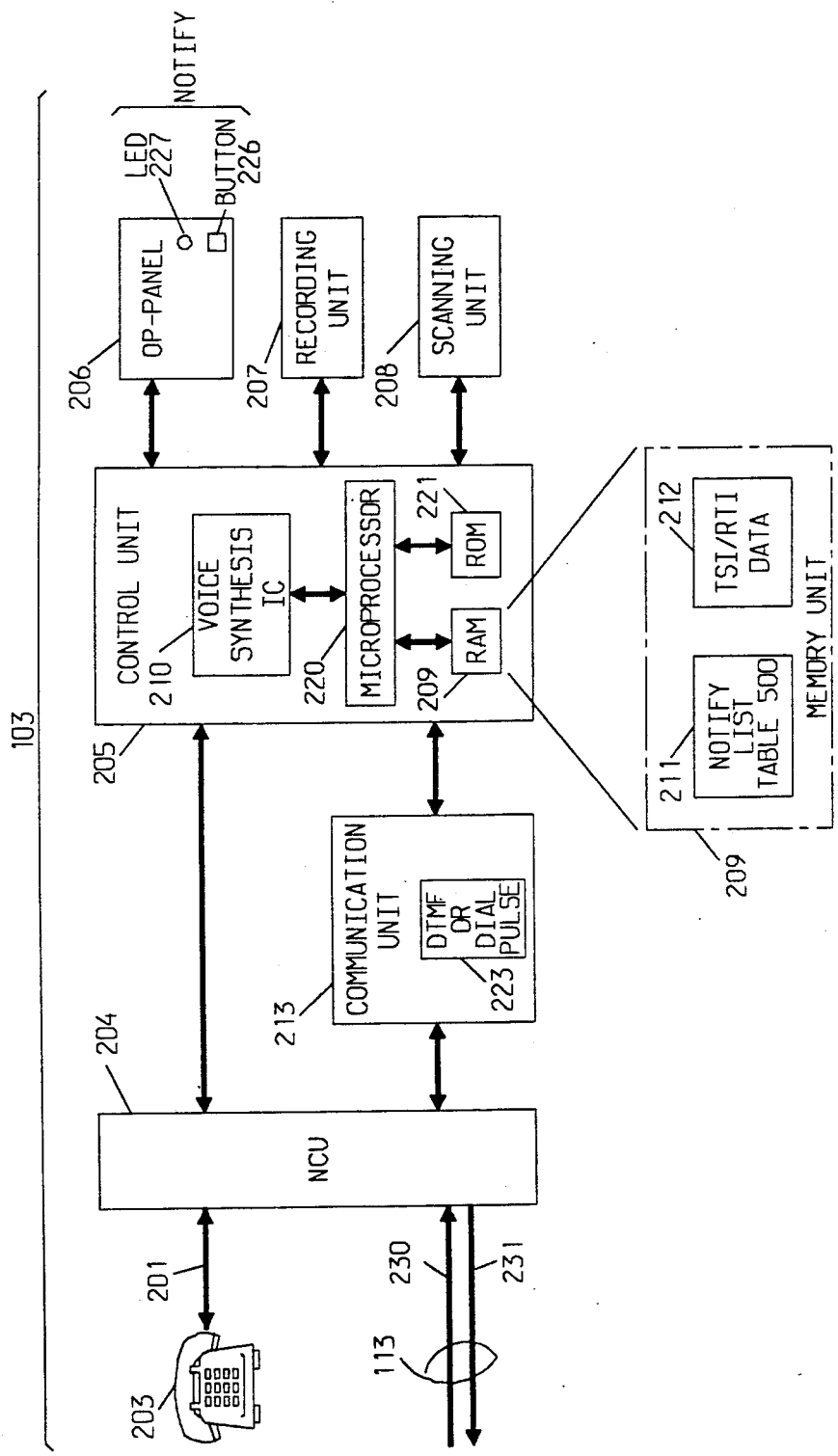
FIG. 2 shows an overall configuration of one embodiment of a facsimile machine useful in describing the present invention.

Shown in FIG. 2 is a block diagram of one embodiment of a facsimile machine 103 useful in describing the present invention. In the drawing, Network Control Unit (NCU) 204 controls in a known manner the interface to facility 113 which connects the facsimile machine to a telephone switch network 102. Facility 113 may include one line used both to receive facsimile messages and to dial-out over or may include two separate lines, 230 and 231, one to receive facsimile messages and one to dial-out over, respectively. NCU 204 enables signaling and voice communications via telephone 203, and signaling and data communication, via communication unit 213 and control unit 205, between facsimile machine 103 and network 102.

The control unit 205 controls the overall facsimile machine 103 operation. Control unit 205 operates under program control to control the operations of NCU 204, communication unit 213, operator panel 206, recording unit 207, and scanning unit 208. Control unit 205 includes a microcomputer 220 and ROM 221 and RAM 209 which store the programs necessary to perform the standard facsimile functions and the various features and functions of the present invention. Control unit 205 also includes a voice synthesis integreated circuitry 210 used to record, store and play back a voice message for certain facsimile machine features.

The communication unit 213 contains a modem for modulating and demodulating the image signal and a decoder/encoder for decoding and encoding an image signal. This unit also contains a Dual Tone Multi Frequency (DTMF) generator 223 which is used to dial outgoing calls.

The operator panel 206 contains buttons or switches and a display which enable the user to operate and input information to the facsimile machine. One button is the notify feature button 226 which is used to enable the notify feature of the present invention. the notify button 226 has associated therewith a light emitting diode LED 227 to indicate to facsimile machine users that the notify feature has been activated. According to another embodiment, the notify feature may be activated by the user entering a predefined function code via the associated telephone 203 key pad or other means.

The recording unit 207 is typically a printer incorporated in the facsimile machine and is used in a well-known manner to generate the hard copy of the received facsimile message. The scanning unit 208 is used to read in a well-known manner the image of the document to be transmitted by the facsimile machine. The notify list table 211 of memory 209 is used to store preprogrammed lists (table 500) of users' notify telephone numbers and callers' TSI or RTI information for use with the notify feature of the present invention. These preprogrammed lists are programmed into table 211 by one or more users of facsimile machine 103. The memory unit 209 may be implemented using a non-volatile RAM.

Because the operations of the above-mentioned units of the facsimile machine are well known, their operation will not be further described. However, where the operation of any of these units is modified in accordance with the present invention, that unit's operation will be described more completely. Thus, using the figures and description of this specification as a guide, the operations of the present invention should be integrated into the hardware and program control structure of the facsimile machine so as to compatibly cooperate with other features and operations of the facsimile machine.

Figure 3:
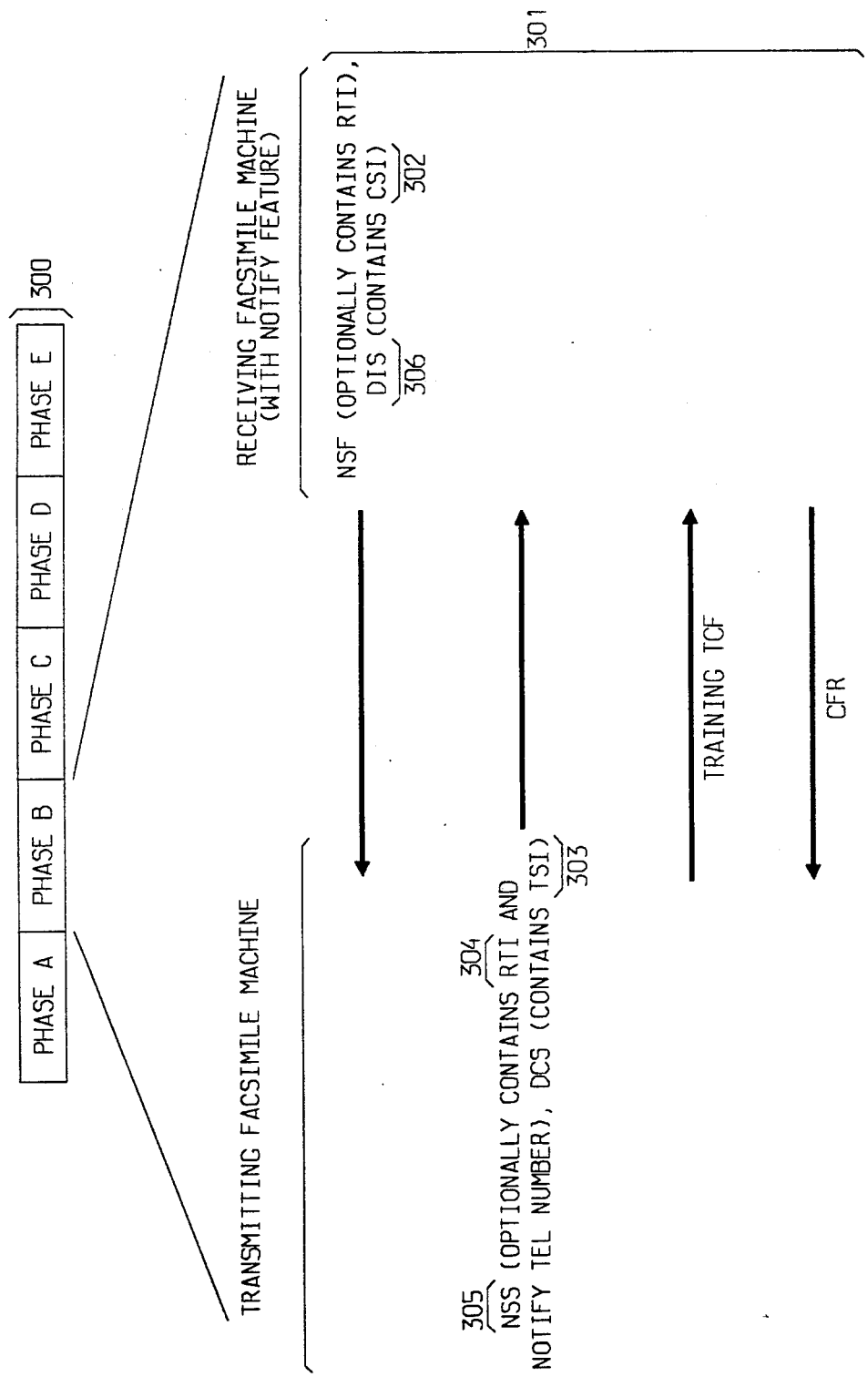
FIG. 3 is a diagram showing the standard facsimile message transmission format including the CCITT T.30 procedure for sending TSI and RTI information during the facsimile machine handshake sequence.

FIG. 3 is a diagram of the standard facsimile message transmission format 300. The message format 300 includes the well-known call establishment phase (phase A), pre-message procedure (phase B), in-message procedure (phase C), post-message procedure (phase D) and call-release procedure (phase E).

The remainder of FIG. 3 shows a diagram of the signals sent and received during "phase B" of a standard CCITT facsimile transmission. Phase B pre-message procedure is also referred to as the handshake or setup phase of a facsimile transmission which occurs before a video data transmission begins. The well-known information shown in FIG. 3 is taken from CCITT T.30 requirements for Group 3 facsimile transmissions. A more complete description of the facsimile message transmission format is described in the monograph "CCITT Recommendation T.30 Procedures for Document Facsimile Transmission in the General Switched Telephone Network" available from the CCITT standards organization. It should be noted that the present invention can be implemented in a straightforward way to operate with Group 4 compatible facsimile machines.

During phase B, transmission binary coded information 301 is exchanged in well-known manner between the transmitting and receiving (called) facsimile machine. In the following description, we assume that FIG. 2 represents the called facsimile machine and the transmitting facsimile machine (not shown) is connected via facility 113 to the called facsimile machine. During this handshake exchange, the called facsimile machine sends Called Subscriber ID (CSI) 302 information to the transmitting facsimile machine as part of the Digital Identification Signal (DIS) 306. The transmitting facsimile machine sends a Transmitting Subscriber ID (TSI) 303 as part of the Digital Command Signal (DCS) 307. The transmitting facsimile machine may also optionally send a Remote Terminal ID (RTI) 304 as part of a Non-standard Facilities Setup (NSS) 305 information to the called facsimile machine.

The TSI and CSI information fields are up to 20 digits long. To enable compatible transmission between facsimile machines of different manufacture, the TSI and CSI have been standardized by CCITT T.30 requirements. According to this standard, the TSI contains the international telephone number of the transmitting facsimile machine while CSI contains the international telephone number of the called facsimile machine. However, a user could set up a non-standard network where the TSI and CSI data of transmitting and receiving facsimile machines, respectively, can be programmed by the user to contain any numerical information the user wishes.

The RTI field is a non-standard facility implementation allowed by the CCITT T.30 requirements. In accordance with the present invention, the RTI field is used to send alpha-numeric characters that can be used to further identify the called and transmitting facsimile machines to each other. As noted however, such non-standard facilities such as RTI can only be used between capable facsimile machines (typically those available from the same manufacturer).

After the successful exchange of TSI, RTI and CSI information, the Training Check Field (TCF) and Confirmation To Receive (CTR) signals are exchanged in the well-known manner to complete phase B.

Additionally, according to another aspect of the invention, the facsimile message sender can specify the address (i.e., telephone number, extension, name, electronic mail address, etc.) of the person to be notified of the receipt of a facsimile message. This address may be included as part of the non-standard facilities setup 305 information of the pre-message portion 301 of the facsimile protocol procedure. The receiving or called facsimile machine can detect this address and use this information directly to notify the intended party.

While the disclosed embodiment uses phase B to identify the user to be notified, information from any other portion of the standard facsimile message transmission format 300 (referred to herein as the control portion of the facsimile message) may be utilized.

Figure 4:
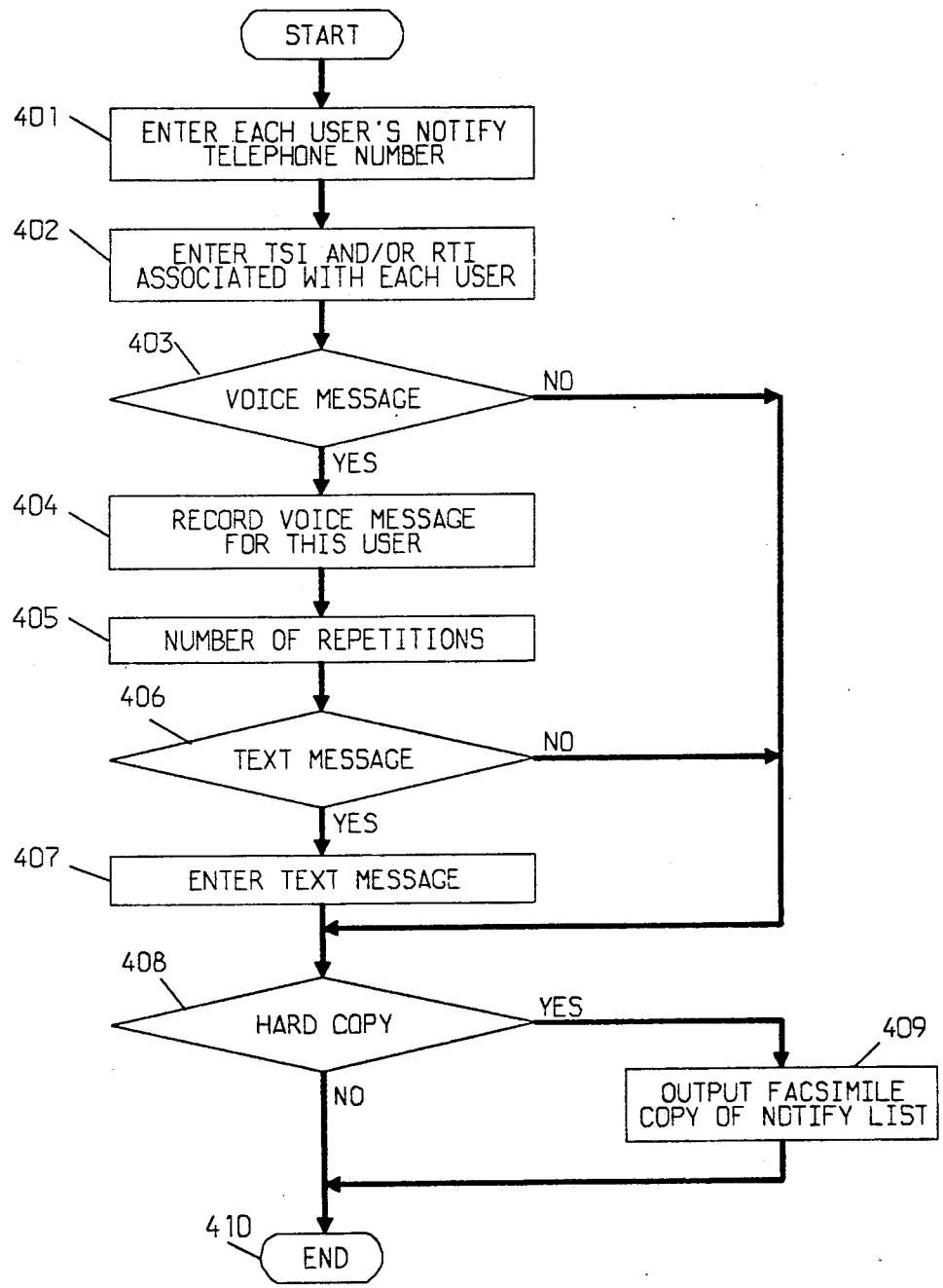
FIG. 4 is a flow chart describing the programming of user data and recording of voice messages used in the present invention.

FIG. 4 shows a flow chart describing the program mode of the present invention. In step 401, an operator or user at facsimile machine 103 or 109 uses the operator panel 206 to program each facsimile machine user's notify telephone number (column 501 of FIG. 5). In step 402 for each user notify telephone number listed, the TSI and/or RTI information associated therewith are entered. In step 403, the operator may optionally select if a voice message is to be included with the notify message. If so, then in step 404 the operator records any voice message to be played as part of the notify message to the notified telephone number. Optionally, any one of a group of factory prerecorded voice messages (stored in voice synthesis chip 210) can be selected for use by the operator by selecting the code associated with the desired voice message. The voice message selection identification code is stored in column 503 of table 500.

In step 405, the operator may also select the number of times the voice message will be played to the notified telephone number. This data is stored in column 504 of table 500. In step 406, the operator may optionally select if a data message (including text or image data) is to be included with the notify message. In step 407, the operator enters the text message or selects from a list of standard text messages. The message selection identification code is stored in column 505 of table 500. In step 408, the operator may choose to obtain a copy of the programmed notify list table entries (FIG. 5), step 409, or to terminate the program mode, step 410.

With reference to FIG. 5, and in accordance with the present invention, the notify telephone number, column 501 (for illustrative purposes, shown only as including a telephone number), can include a multi-character string sequence of telephone number digits (0-9), asterisk (*), pound sign (#), pause symbol (P) indicating delay, recall symbol (RS) indicating a timed switch hook flash, wait for Dial Tone Symbol (DTS), Wait for Off-Hook symbol (WOH) and switch from pulse to DTMF dialing (T) symbol. Thus, the notify telephone number in column 501 may be associated with a facsimile machine user, e.g., 511, 512, or one or more maintenance or service personnel, e.g., 514, 515. The TSI/RTI column 502 may include any alpha-numeric character string, typically a telephone number or extension number, e.g., 516 or the name of a person or company, e.g., 517 and 518 respectively.

According to another aspect of the present invention, some of the TSI/RTI column 502 list items may include a "wild card" or "don't care" character, illustrated herein as an "*". Any stored TSI/RTI list item, such as ATT*, item 519, including such a wild card character, would be considered a match for any received list item which is preceded by the ATT character string. Thus, for example, a received facsimile message including ATT DENVER or ATT SAN FRAN as a TSI/RTI list item 502 would result in a notify messsage being sent to the list 1 telephone number 957-2000, as shown by 511. Note, as if ATT SAN FRAN was the received list item a match exists with both the stored list items 519 and 524. Thus, both the list 1 telephone number 957-2000 and list 2 telephone number 691-8937 would be sent a notify message.

The TSI/RTI column 502 can also include a default character string 523 to identify a user, e.g., 513, to be notified if a facsimile message is received from any TSI/RTI not found to be associated with any user. Thus, for example, a facsimile message received from a TSI telephone number, e.g., 943-1112 would default, to the secretary 513 since it is not listed as the TSI telephone number in any user list 1 or 2. The facsimile machine would then notify the secretary by dialing 957-3284. In accordance with another aspect of the present invention, the TSI/RTI information in column 502 or the received TSI/RTI (303, 304) may also be outputted as part of a text message to the notified user if that notified user has a character display on their telephone or other receiving apparatus (e.g., display telephone 112).

While the users 511-513 are notified following an error-free reception of facsimile messages, other conditions can trigger the need for a notify message to be sent. For example, a certain number of transmission errors or other predefined types of errors or trouble conditions (e.g., malfunction of the facsimile machine, maintenance condition, etc.) may warrant a notify message to be sent to maintenance or other personnel. The equipment malfunction condition may indicate, for example, that the facsimile machine is out of paper or jammed or that the cover is left open. Alpha-numeric characters may be used, e.g., in the TSI/RTI field to identify the types of errors to be referred to a particular notify telephone number. Thus, for example, as shown by 514, a "transmission errors exceeded" condition should notify the maintenance person at 957-3285 using voice announcement number 2 (see column 503 entry for row 514). As shown by 515, an "out of paper" or other equipment malfunction condition should notify the secretary at 957-3284. Note, a different prerecorded notify message, voice announcement number 3, corresponding to this particular error condition, is outputted to the secretary.

In accordance with one aspect of the present invention, the facsimile machine notify message may include a notify telephone number including a multi-character string sequence of alpha-numeric characters. These alpha-numeric characters would be sent by facsimile machine 109 using a variety of DTMF or other call signaling modes which are compatible with apparatus to which the facsimile interfaces. For example, as previously discussed in FIG. 1, the facsimile machine 109 may be connected to a key or PBX system 106. In such an arrangement, the facsimile machine 109 notify message signaling is compatible with the key or PBX system 106 to enable the facsimile machine 109 to activate various message waiting, paging broadcast and other features of that system. Thus, for example, when the key telephone is an AT&T MERLIN ® communication system, some of the features which may be activated by a facsimile machine 103 incorporating the present invention are shown in the table 600 of FIG. 6.

With reference to FIG. 6, an illustrative list of dialing commands 601 illustrates the code *60 required to enable a message waiting feature to be activated by system 106. Note, the character * in this discussion is the touch tone key pad character and not the wild card character * of column 502. The character P generates a timing pause to enable the system 106 to set up to receive the extension number 73148. The example 601 enables the message light (e.g., 122) at extension 73148 (e.g., station 112) to be turned on to indicate the arrival of a facsimile message. Note that in this implementation no voice message is provided with this message waiting feature. Obviously, if desirable a voice message can be used to supplement the message waiting feature.

In our example, 602, a message code preceded by a pound sign (#) enables the cancellation of the previous message. That is, #60 cancels the previous message to extension 73145 while *60 enables a new message to be sent to extension 73145. Again, no voice message is left for extension 73145.

Example 603, illustrates that no special code is required to leave a voice message for telephone extension 73147. Note, instead of using pauses (P) facsimile machine 109 could detect when the far end equipment answers and then play a message. Thus, the wait for off-hook (WOH) symbol would replace the group of pauses (P) in 603. In this example 603, the YES, 1 entry in the voice message column 610 means that the voice message 1 is repeated three times as specified by column 611.

Example 604 illustrates the procedure for calling a pocket page system 114 (i.e., 555-1234) and leaving phone number 957-3146 thereat.

Example 605 illustrates a paging operation to station 10, via its speaker, where the voice announcement is played only once. As indicated by YES, 2 in the voice message column 610, prerecorded voice announcement number two is outputted to station 10.

Example 606 illustrates the digits required to activate a loudspeaker paging feature or system 108 and to announce the voice message once.

Example 607, illustrates the message code required to call a predefined group of stations and to repeat a voice message thereat three times. Example 608 illustrates the message code for initiating a page to a predetermined group of stations through the station speakers and to play the voice message once thereat.

Shown in steps 701-703 of FIG. 7 is a flowchart for receiving and storing TSI and optical RTI information received from the transmitting facsimile machine into the Memory Unit 209 of the called fasimile machine 103. During the Phase B portion of the facsimile transmission, the called facsimile machine checks, step 702, to see if the Notify feature has been turned-on. Typically, the feature can be turned-on or turned-off by the user inputting information to the facsimile machine 103 via the operator panel 206. If the feature is "on", then in step 703, the called facsimile machine 103 stores, in location 212 of the memory unit 209, the TSI information from a transmitting facsimile machine of a different manufacturer. If both machines are from the same manufacturer, both the TSI and RTI of the transmitting facsimile machine are stored in the memory of the called facsimile machine 103.

The remaining steps of FIG. 7 show one embodiment of how the stored TSI and RTI information is used by facsimile machine 103 to notify the user that a facsimile message has been received. In step 710, the facsimile machine. determines in a well-known manner whether the facsimile message was correctly received (i.e., without error). Note, in an alternate embodiment, described in a later paragraph, a notify message can also be outputted in response to a correctly-transmitted facsimile message. If the message was incorrectly received, control is transferred to step 722. Assuming a correct message reception 711, the receiving facsimile machine checks 712 if the notify feature is activated. If the notify feature is "on", the TSI and/or RTI information received during the handshake procedure and stored in location 212 of memory unit 209 is compared to the preprogrammed list of TSI and/or RTI data that are contained in the notify list table (FIG. 5) 211 of the memory unit 209.

If the notify feature is not activated, no user is notified of the receipt of a facsimile message. If the notify feature is activated, the TSI and/or RTI data is stored in location 212 of memory 209 and then checked against the previously programmed TSI/RTI items associated with the first list 511 in steps 713-717. When a match is obtained, the notify condition is satisfied in step 721.

If the TSI and/or RTI data is not found in list 1, and list 1 was the last list 718 and no "all other" TSI/RTI notify number is programmed (e.g., 523), then no notification message is sent, 732. If list 1 was not the list, the next list (list 2) is obtained 719 and checked in steps 714-717 until either no match is found—in which case the next list (list 3) is checked—or a match is found and the notify message condition is satisfied in step 721.

The status condition satisfied step 721, can be reached in other ways. For example, in accordance with the present invention, predetermined conditions such as predetermined number of transmission errors, out of paper, 723, printer malfunction 724 or other well-known conditions 725 (e.g., cover open, paper jam, etc.) may also cause a notify message to be sent. Note, each of these conditions may have a unique message associated therewith. Once the condition satisfied step 721 is reached, the facsimile machine 103 goes off-hook in step 730 on facility 113. In step 731, the notify list table 500 is checked to determine if a notify telephone number exists to be dialed. If no notify telephone number exists for the status stimuli, then no one is notified in step 732. If a notify telephone number exists, it is repertory dialed in step 733. Thus, for example, with reference to 514 of FIG. 5, if the initiating status stimuli was a predetermined number of transmission errors the maintenance number 957-3285 would be dialed. Similarly, illustratively, an "out of paper" condition may cause the equipment malfunction number to be dialed as illustrated by 515 of FIG. 5.

Following step 723, the control unit, in step 734 checks in table 500 whether a data (e.g., text) message is to be outputted to the called location. As noted, column 505 in table 500 indicates whether a data message exists and the address of the data message. For example, in row 515 the maintenance person receives a data message number 1 (see column 505) as part of a notify message. Control unit 205 obtains the data message which is outputted, in step 735, for display at the telephone or other apparatus reached after the notify telephone number is dialed. After the data message is outputted, the facsimile machine 103 goes on-hook If no data message was indicated, then control unit proceeds to step 744. In step 744, the control unit 205, checks if table 500 has an associated voice message stored, in column 503, for the particular status stimuli (e.g., 722-725). Thus, for example, an appropriate voice message such as "excessive transmission errors" or "out of paper" may be played to the called party, step 746. In step 745, the existence of a far end off-hook detector is checked. If no off-hook device is installed in facsimile machine 103, the voice message 746 is outputted or played a number of times, steps 747,748, to ensure that an answering party would hear the message. In step 749, the facsimile machine 103 goes on-hook.

When an off-hook detector 745 is provided in the facsimile machine 103, it detects when the called party has answered the phone prior to playing the voice message 750. Thereafter, in step 749, the facsimile machine 103 returns to the on-hook condition.

As previously noted, the facsimile machine 103 of the present invention can also be implemented to notify a user of the status of his or her facsimile message which was to be transmitted by facsimile machine 103. This feature is called the transmit facsimile message notify feature and begins at 760 of FIG. 7. Such a feature may be utilized, for example, when a user puts documents in facsimile machine 103, dials the receiving location number, establishes the connection, presses start and then leaves facsimile machine 103 before all of the documents have been faxed. In accordance with the present invention, the user can enter, in step 761, his or her notify telephone or extension number which should receive the notify message associated with that facsimile transmission. Alternatively, in step 761, the user can enter his or her system password which the facsimile machine 103 could convert into the user's telephone number (which was previously stored in the machine).

Thereafter in step 721, a notify message is sent to indicate that a successful facsimile transmission has occurred. Note, if the facsimile transmission was not successful, one of the other conditions 722-725 would cause a notify message to be sent in step 721.

The remaining sequence of steps which implement the remainder of the transmit facsimile message notify feature may be a subset or all of the previously described steps 721-750.

What has been disclosed is merely illustrative of the present invention and other arrangements or methods can be implemented by those skilled in the art without departing from the spirit and scope of the present invention.

We claim:

1. A facsimile apparatus for receiving a facsimile message, comprising
    means for determining one of a plurality of predetermined transmission statuses of a facsimile message received over a facility connected to said facsimile apparatus,
    means for storing a group of verbal status messages, each of said statuses being associated with one of said group of verbal status messages,
    means for dialing a call over said facility to a preprogrammed number in response to said determined status of said received facsimile message, and
    means for outputting a verbal status message, selected using said determined status, over said facility following the operation of said dialing means.

2. The facsimile apparatus of claim 1 wherein said facsimile apparatus further comprises
    means for detecting a predetermined condition at said facsimile apparatus, and
    wherein said dialing means dials a preprogrammed number selected in response to said detected predetermined condition and wherein said outputted status message indicates said condition in said facsimile apparatus.

3. The facsimile apparatus of claim 1 wherein said status indicates that the facsimile message was received error-free, and wherein said status message indicates the error-free reception of said facsimile message.

4. The facsimile apparatus of claim 1 further comprising
    means responsive to said status for signaling data messages over said facility following the operation of said dialing means, said data message indicating the reception status of said facsimile message.

5. The facsimile apparatus of claim 1 wherein said status message is a prerecorded voice message.

6. The facsimile apparatus if claim 5 wherein said status message is outputted a plurality of times over said facility.

7. The facsimile apparatus of claim 1 further including means for detecting an off-hook condition on said facility following the operation of said dialing means and in response thereto enabling said output means.

8. A facsimile apparatus for receiving a facsimile message, comprising
   means for determining one of a plurality of predetermined transmission statuses of a facsimile message received over a facility connected to said facsimile apparatus,
   means for storing a group of verbal status messages, each of said statuses being associated with one of said group of verbal status messages.
   means for dialing a call over a second facility to a preprogrammed number in response to said determined status of said received facsimile message, and
   means for outputting a verbal status message, selected using said determined status, over said facility following the operation of said dialing means.

9. A facsimile apparatus comprising
   means for determining one of a plurality of predetermined transmission statuses of a facsimile message transmitted over a facility connected to said facsimile apparatus,
   means for storing a group of verbal status messages, each of said statuses being associated with one of said group of verbal status messages,
   means for dialing a call over said facility to a preprogrammed number in response to said status of said transmitted facsimile message, and
   means for outputting a verbal status message over said facility following the operation of the dialing means.

10. A facsimile apparatus arranged to receive a facsimile message transmitted over a facility, the facsimile apparatus comprising
    means for detecting transmitter location information in the control portion of a facsimile message received over said facility, said transmitter location information being other than a telephone number, and
    means responsive to said detected information for identifying a user from a plurality of predefined users of said facsimile apparatus, as the intended recipient of said facsimile message and for notifying the intended recipient of the receipt of said facsimile message.

11. The facsimile apparatus of claim 10 wherein said identifying and notifying means notifies said identified user by dialing a call over a second facility connected to said facsimile apparatus.

12. The facsimile apparatus of claim 10 wherein said identifying and notifying means dials a predetermined telephone number associated with said user and thereafter outputs a message indicating the reception of said facsimile message.

13. The facsimile apparatus of claim 10 wherein the detected information is located in the transmitting subscriber identification segment of a control section of the facsimile message.

14. The facsimile apparatus of claim 10 wherein the detected information is located in the remote terminal identification segment of the control section of the facsimile message.

15. The facsimile apparatus of claim 10 wherein the detected information includes a transmitting location identifier identifying a source of the transmitted facsimile message, and wherein said identifying and notifying means includes
    means for listing a plurality of user telephone numbers, each telephone number associated with a different user at said facsimile apparatus and each telephone number also having associated therewith one or more transmitting location identifiers, and
    wherein said identifying and notifying means uses said transmitting location identifier to select from said listing means a telephone number identifying a user from said plurality of said predefined users.

16. The facsimile apparatus of claim 10 wherein the detected information includes the telephone number of the recipient of said facsimile message.

17. The facsimile apparatus of claim 10 wherein said identifying and notifying means uses a subset of the detected information to identify the recipient.

18. A method of operating a facsimile apparatus which receives from a sender a facsimile message comprising the steps of
    determining one of a plurality of predetermined transmission statuses of a facsimile message received over a facility connected to said facsimile apparatus,
    storing a group of verbal status messages, each of said statuses being associated with one of said group of verbal status messages,
    dialing a call over a second facility to a preprogrammed number in response to said determined status of said received facsimile message, and
    outputting a verbal status message, selected using said determined status over said facility following the operation of said dialing.

19. A method of operating a facsimile apparatus comprising the steps of
    detecting transmitter location identifier information other than a telephone number in a control section of a facsimile message received over a facility connected to said facsimile apparatus,
    in response to said detected information, identifying a user from a plurality of predefined users of said facsimile apparatus and
    notifying the identified user of the receipt of said facsimile message.

20. A method of operating a facsimile apparatus comprising the steps of
    determining one of a plurality of predetermined transmission statuses of a facsimile message transmitted over a facility connected to said facsimile apparatus,
    storing a group of verbal status messages, each of said statuses being associated with one of said group of verbal status messages.
    dialing a call over said facility to a preprogrammed number in response to said status of said transmitted facsimile message, and
    outputting a verbal status message over said facility following the dialing operation.

21. A method of operating a facsimile apparatus comprising the steps of
    detecting a predetermined condition at said facsimile apparatus,
    dialing, over a facility connected to said facsimile apparatus, a call to a preprogrammed number in response to said condition of said facsimile apparatus, and outputting a status message over said facility following said dialing step.

22. A facsimile apparatus comprising means for detecting transmitter location information other than a telephone number in the control portion of a facsimile message received over a facility connected to said facsimile apparatus, means responsive to said detected information for dialing a call over said facility to at least one of a plurality of preprogrammed numbers as determined from information received in a control portion of said facsimile message, and means for outputting a message which indicates the arrival of a facsimile over said facility to respectively at least one of a plurality of intended recipients following the operation of said dialing means.

23. A facsimile apparatus comprising means for determining a status of a facsimile message received over a facility connected to said facsimile appparatus, means in response to said status of said received facsimile message for dialing a call over said facility to a certain one or more of a plurality of preprogrammed numbers depending upon the status of said received facsimile message, and means for outputting a message over said facility following the operation of said dialing means.

24. A method of operating a facsimile apparatus comprising the steps of detecting transmitter location information other than a telephone number in the control portion of a facsimile message received over a facility connected to said facsimile apparatus, dialing a call in response to said detected information over said facility to at least one of a plurality of preprogrammed numbers as determined from information received in a control portion of said facsimile message, and outputting a message which indicates the arrival of a facsimile over said facility to respectively at least one of a plurality of intended recipients following the operation of said dialing means.

25. A method of operating a facsimile apparatus comprising the steps of determining a status of a facsimile message received over a facility connected to said facsimile apparatus, dialing a call in response to said status of said received facsimile message over said facility to a certain one or more of a plurality of preprogrammed numbers depending upon the status of said received facsimile message, and means for outputting a message over said facility following the operation of said dialing means.

26. A facsimile apparatus arranged to receive a facsimile message transmitted over a facility, the facsimile apparatus comprising means for detecting information in the control portion of a facsimile message received over said facility, means responsive to said detected information for identifying a user from a plurality of predefined users of said facsimile apparatus, as the intended recipient of said facsimile message and for notifying the intended recipient of the receipt of said facsimile message, said detected information including a transmitting location identifier identifying a source of the transmitted facsimile message, and said identifying and notifying means including means for listing a plurality of user telephone numbers, each telephone number associated with a different user at said facsimile apparatus and each telephone number also having associated therewith one or more transmitting location identifiers, and wherein said identifying and notifying means uses said transmitting location identifier to select from said listing means a telephone number identifying a user from said plurality of said predefined users.

27. A facsimile apparatus arranged to receive a facsimile message transmitted over a facility, the facsimile apparatus comprising means for detecting information other than a telephone number of the transmitter location in the control portion of a facsimile message received over said facility, and means responsive to said detected information for identifying a user from a plurality of predefined users of said facsimile apparatus, as the recipient of said facsimile message and for notifying the recipient of the receipt of said facsimile message, wherein the detected information is located in the transmitting subscriber identification segment of a control section of the facsimile message.

* * * * *

(12) EX PARTE REEXAMINATION CERTIFICATE (5397th)
United States Patent
Bell et al.

(10) Number: US 5,127,047 C1
(45) Certificate Issued: Jun. 13, 2006

(54) FACSIMILE MACHINE HAVING USER NOTIFICATION CAPABILITY

(75) Inventors: John F. Bell, Howell, NJ (US); Carole R. Katz, Morris Plains, NJ (US); Mark E. Millman, Bayville, NJ (US); Mary Nesius, Califon, NJ (US); Ellen O'Brien, Neptune City, NJ (US); Michael L. Vandervoort, Shreveport, NJ (US); Gary N. Weber, Ocean, NJ (US)

(73) Assignee: The Bank of New York, New York, NY (US)

Reexamination Request:
No. 90/006,516, Jan. 17, 2003

Reexamination Certificate for:
Patent No.: 5,127,047
Issued: Jun. 30, 1992
Appl. No.: 07/482,366
Filed: Feb. 20, 1990

(51) Int. Cl.
*H04M 11/00* (2006.01)

(52) U.S. Cl. .............. 379/100.06; 379/100.14; 379/355.01; 379/88.13; 379/88.24; 358/439

(58) Field of Classification Search ............ 379/100.01, 379/93.01, 100.06, 100.14, 355.01, 88.13, 379/88.24; 358/439
See application file for complete search history.

(56) References Cited

FOREIGN PATENT DOCUMENTS

| JP | SHO 59-204349 | 11/1984 |
| JP | 359204349 A | * 11/1984 |
| JP | SHO 61-236276 | 10/1986 |
| JP | 63-232560 | 9/1988 |
| JP | HEI 1-190067 | 7/1989 |
| JP | 401190067 A | * 7/1989 |

\* cited by examiner

*Primary Examiner*—Melur Ramakrishnaiah

(57) ABSTRACT

A facsimile machine determines the status of a received or a transmitted facsimile message and, in response thereto, dials a specified telephone number and outputs a status message to notify a user of the status of the received or transmitted facsimile message. Another feature outputs a status message to indicate a predetermined condition at the facsimile machine. The status message may include an audio message to a data message. Another feature uses information detected in the control portion of the facsimile message to identify which of a plurality of predefined facsimile machine users is to be notified of the receipt of the facsimile message. In one embodiment, the detected information includes the identity of the location that transmitted the facsimile message.

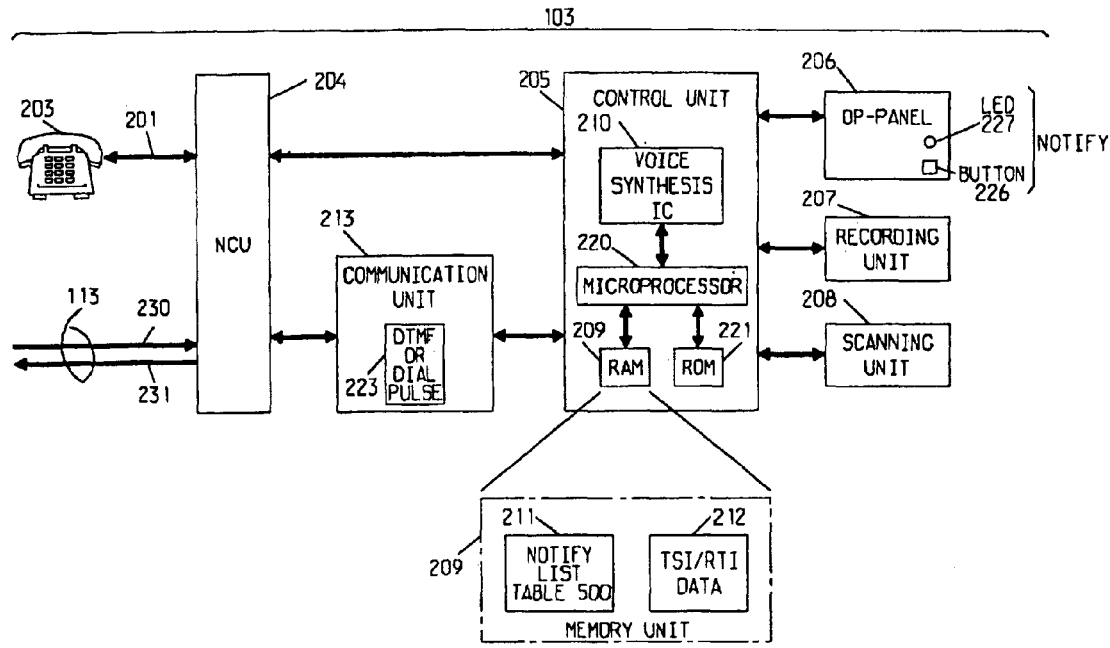

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7, 9–20, 22, 24 and 26–27 is confirmed.

Claims 8, 21, 23 and 25 are determined to be patentable as amended.

8. A facsimile apparatus for receiving a facsimile message, comprising
  means for determining one of a plurality of predetermined transmission statuses of a facsimile message received over a facility connected to said facsimile apparatus,
  means for storing a group of verbal status messages, each of said statuses being associated with one of said group of verbal status [messages.] *messages,*
  means for dialing a call over a second facility to a preprogrammed number in response to said determined status of said received facsimile message, and
  means for outputting a verbal status message, selected using said determined status, over said facility following the operation of said dialing means.

21. A method of operating a facsimile apparatus comprising the steps of
  detecting a predetermined condition [at] *from among conditions of* said facsimile apparatus *comprising errors and trouble conditions,*
  dialing, over a facility connected to said facsimile apparatus, a call to a preprogrammed number in response to said condition of said facsimile apparatus, and
  outputting a status message over said facility following said dialing step.

23. A facsimile apparatus comprising
  means for determining a status of a facsimile message received over a facility connected to said facsimile apparatus,
  means in response to said status of said received facsimile message for dialing a call over said facility to a certain one or more of a plurality of preprogrammed numbers [depending upon] *that correspond to* the status of said received facsimile message, *wherein different statuses of the message correspond to different one or more of said plurality of preprogrammed numbers,* and
  means for outputting a message over said facility following the operation of said dialing means.

25. A method of operating a facsimile apparatus comprising the steps of
  determining a status of a facsimile message received over a facility connected to said facsimile apparatus,
  dialing a call in response to said status of said received facsimile message over said facility to a certain one or more of a plurality of preprogrammed numbers [depending up on] *that correspond to* the status of said received facsimile message, *wherein different statuses of the message correspond to different one or more of said plurality of preprogrammed numbers,* and
  means for outputting a message over said facility following the operation of said dialing means.

* * * * *